United States Patent
White

(10) Patent No.: US 9,464,672 B2
(45) Date of Patent: Oct. 11, 2016

(54) ROLLING BEARING WITH INTEGRATED ELECTRICAL SHUNT

(71) Applicant: Schaeffler Technologies AG & Co. KG, Herzogenaurach (DE)

(72) Inventor: Michael White, Fairview, PA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/854,568

(22) Filed: Sep. 15, 2015

(65) Prior Publication Data

US 2016/0032981 A1 Feb. 4, 2016

Related U.S. Application Data

(62) Division of application No. 14/224,586, filed on Mar. 25, 2014, now Pat. No. 9,175,728.

(60) Provisional application No. 61/821,405, filed on May 9, 2013.

(51) Int. Cl.
| | |
|---|---|
| *F16C 19/50* | (2006.01) |
| *F16C 41/00* | (2006.01) |
| *F16C 33/46* | (2006.01) |
| *F16C 33/78* | (2006.01) |

(Continued)

(52) U.S. Cl.
CPC ............ *F16C 41/002* (2013.01); *F16C 19/52* (2013.01); *F16C 33/3806* (2013.01); *F16C 33/46* (2013.01); *F16C 33/4605* (2013.01); *F16C 33/78* (2013.01); *F16C 33/7816* (2013.01); *F16C 33/7843* (2013.01)

(58) Field of Classification Search
CPC .... F16C 19/52; F16C 33/38; F16C 33/3806; F16C 33/46; F16C 33/4605; F16C 41/002
See application file for complete search history.

(56) References Cited

U.S. PATENT DOCUMENTS

| 3,564,477 A | 2/1971 | Pompei |
| 3,994,545 A | 11/1976 | Van Dorn |
| 5,059,041 A | 10/1991 | Watanabe et al. |

(Continued)

FOREIGN PATENT DOCUMENTS

| DE | 102004051186 | * | 4/2006 |
| DE | 102010012664 | * | 9/2011 |

(Continued)

OTHER PUBLICATIONS

Translation of WO 2009/056098 obtained Apr. 15, 2015.*

(Continued)

*Primary Examiner* — James Pilkington
(74) *Attorney, Agent, or Firm* — Volpe and Koenig, P.C.

(57) ABSTRACT

A rolling bearing assembly with electrical discharge damage protection is provided. The rolling bearing assembly includes radially inner and outer bearing rings that each have a race. A roller assembly including a plurality of rolling elements that are supported to roll on the races is provided. A shield extends radially between the radially outer ring and the radially inner ring. The shield includes a body portion with one radial end that is fixed to one of the radially inner or outer rings, at least one electrically conductive seal on a surface of the body portion, and a plurality of filaments extending on an opposite radial end of the body portion from the fixed radial end that contacts the other of the radially inner or outer rings.

4 Claims, 4 Drawing Sheets

(51) Int. Cl.
*F16C 19/52* (2006.01)
*F16C 33/38* (2006.01)

(56) References Cited

U.S. PATENT DOCUMENTS

| | | | |
|---|---|---|---|
| 5,139,425 | A | 8/1992 | Daviet et al. |
| 6,142,673 | A | 11/2000 | Kottritsch et al. |
| 6,755,572 | B1 | 6/2004 | Kinbara |
| 6,976,682 | B1 * | 12/2005 | Macleod ............ F16J 15/43 277/410 |
| 7,071,589 | B2 | 7/2006 | Bramel et al. |
| 7,136,271 | B2 | 11/2006 | Oh et al. |
| 7,193,836 | B2 | 3/2007 | Oh et al. |
| 7,498,703 | B2 | 3/2009 | Rea et al. |
| 7,878,814 | B2 | 2/2011 | Chin et al. |
| 8,169,766 | B2 | 5/2012 | Oh et al. |
| 8,199,453 | B2 | 6/2012 | Oh et al. |
| 8,248,725 | B2 | 8/2012 | Hendriks et al. |
| 8,432,659 | B2 | 4/2013 | Oh et al. |
| 2004/0233592 | A1 | 11/2004 | King et al. |
| 2006/0007609 | A1 | 1/2006 | Oh et al. |
| 2009/0304318 | A1 | 12/2009 | Konno et al. |
| 2010/0195946 | A1 | 8/2010 | Zhou et al. |
| 2011/0129176 | A1 | 6/2011 | Koma et al. |
| 2011/0317953 | A1 | 12/2011 | Moratz |
| 2012/0119448 | A1 | 5/2012 | Stewart et al. |
| 2013/0301971 | A1 | 11/2013 | Cudrnak et al. |
| 2014/0334758 | A1 | 11/2014 | White |

FOREIGN PATENT DOCUMENTS

| | | | |
|---|---|---|---|
| DE | 102012214623 | * | 2/2014 |
| JP | 2006226437 | A | 8/2006 |
| WO | 2009056098 | A1 | 5/2009 |

OTHER PUBLICATIONS

Translation of DE102004051186 obtained Mar. 21, 2016.*
Technical Bulletin. Pro Tech SG Bearing Isolators. Parker Hannifin Corporation, Cleveland, OH. dated 2006.
Complete Shaft Grounding Solutions—INPRO/SEAL a Dover Company. Date Unknown (admitted prior art).
SKF Shaft Grounding Ring Kits TKGR series. dated Apr. 2012.
Shaft Grounding. Electro Static Technology-ITW—AEGIS Bearing Protection Ring—Patented Technology. dated 2009.

* cited by examiner

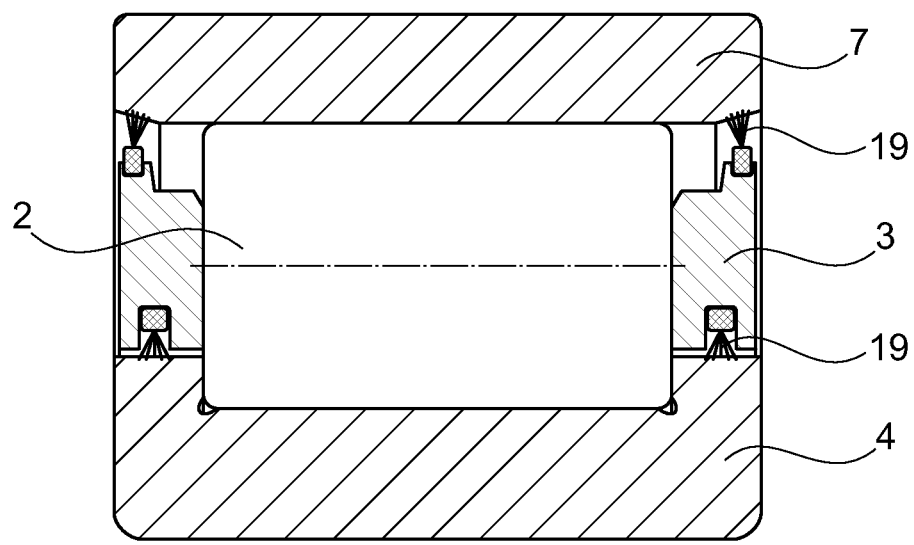
Fig. 5
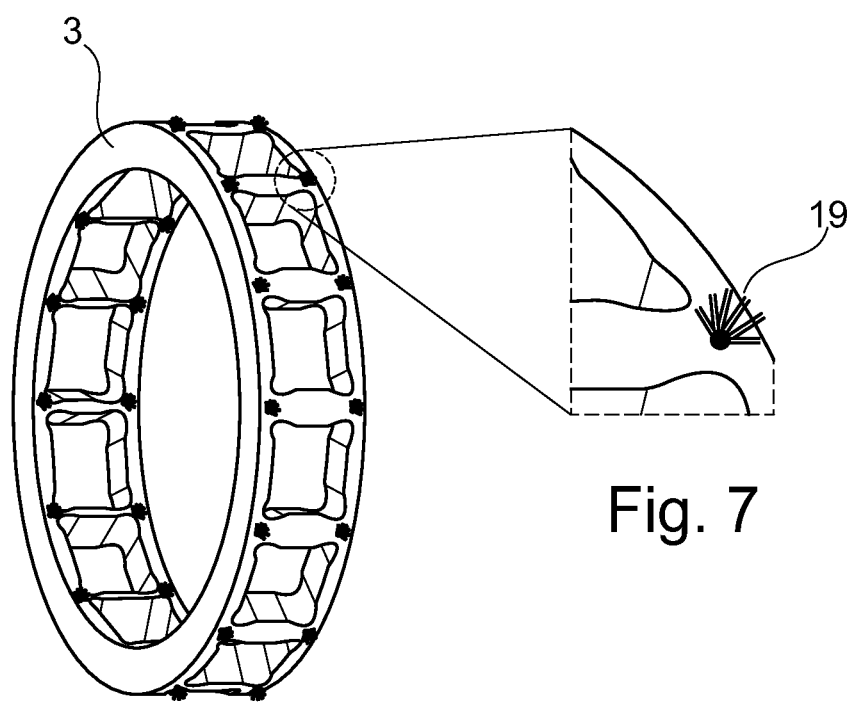
Fig. 7
Fig. 6 an elevational view of a first preferred embodi-# ROLLING BEARING WITH INTEGRATED ELECTRICAL SHUNT

INCORPORATION BY REFERENCE

This application is a divisional application of U.S. patent application Ser. No. 14/224,586, filed Mar. 25, 2014, which claims the benefit of U.S. Provisional Application No. 61/821,405, filed May 9, 2013 which are incorporated by reference as if fully set forth.

FIELD OF INVENTION

This application is generally related to a rolling bearing and more particularly related to electrical discharge damage protection for a rolling bearing.

BACKGROUND

Rolling bearings are widely used in various mechanical applications, including automotive and industrial applications. Grounding devices are used to prevent shaft induced currents from causing electrical discharge machining (EDM) due to electrical currents passing through a rolling bearing component. EDM causes pitting, fluting, and fusion craters on the rolling bearing components resulting in premature rolling bearing failure. Known EDM prevention methods include di-electric ceramic bearing coatings, Faraday shields, electrically conductive bearing grease, and shaft-contacting ground brushes.

Di-electric ceramic bearing coatings include a hard brittle coating that can fracture during installation or during running. Cracks in the coating can allow current to pass through the bearing which results in EDM. Di-electric ceramic bearing coatings also have limited di-electric strength and at high voltage potential, current can pass through the coating structure compromising the EDM protection of the coating. Known Faraday shields are disclosed in U.S. Pat. No. 7,878,814. Faraday shields are expensive to implement in most rolling bearing applications. Electrically conductive grease or liquid metal, such as disclosed in U.S. Pat. No. 8,248,725, are used to allow current to continuously pass through bearing surfaces but may contain elements such as copper, carbon, or phosphorous which can cause excessive wear on the bearing surfaces and lead to premature failure of the rolling bearing.

Spring loaded shaft grounding brushes allow a continuous flow of current to ground. Known grounding brushes are prone to excessive wear, material transfer, and oxide formation on the mating surface. These oxides may become a di-electric and may prevent effective current transfer from the shaft to the ground. This can cause electrical arcing and lead to damage of the shaft. Once the impedance of the shaft grounding brush exceeds the impedance of the bearings, the current can seek ground through the bearings which can potentially cause EDM damage to the bearings. Shaft grounding brushes may also vibrate due to imperfections in the shaft surface, i.e. an out of round condition. When the grounding brush momentarily loses contact with the shaft during vibration, the current can arc from the grounding brush to the shaft causing EDM damage. Alternatively, the current can flow through the bearings if the voltage potential is sufficiently high while the brush loses contact with the shaft during vibration. Traditional spring loaded shaft grounding brushes are prone to rapid and excessive wear and can ultimately lose contact with the shaft causing the current to seek ground through the bearing and causing EDM damage in the bearing. Known shaft grounding brushes are typically not installed too close to the bearing; however, providing a grounding surface near the bearing is essential to protecting the bearing surfaces against EDM.

As shown above, known EDM protection for bearings are either too expensive, unreliable, or can cause damage to the bearing components.

SUMMARY

It would be desirable to provide a cost effective and reliable EDM protection for rolling bearing components.

A rolling bearing assembly with electrical discharge damage protection is provided. The rolling bearing assembly includes radially inner and outer bearing rings. The radially inner bearing ring includes a radially outer race and the radially outer bearing ring includes a radially inner race. The rolling bearing assembly includes a roller assembly including a plurality of rolling elements. The plurality of rolling elements are preferably held in a cage and are supported to roll on the radially outer race of the radially inner ring and the radially inner race of the radially outer ring. A shield extends radially between the radially outer ring and the radially inner ring. The shield includes a body portion with one radial end that is fixed to one of the radially inner or outer rings, at least one electrically conductive seal on a surface of the body portion that contacts the other of the radially inner or outer rings.

In one embodiment, a plurality of filaments extend on an opposite radial end of the body portion from the fixed radial end in order to provide sliding electrical contact with low friction.

In other embodiments of the roller bearing assembly, the conductive seal may extend radially between and contact the radially inner ring and the radially outer ring. The conductive seal may comprise a rubber or polymeric material that includes conductive nanofibers. The roller bearing assembly may include a radially inner shield and a radially outer shield.

In another embodiment, the cage could form the conductive path or at least a part of the conductive path. The cage can include a plurality of brushes that are made of conductive fibers, or conductive fibers can extend from one or both rings into contact with the cage.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 5 is a cross-sectional view of a fourth preferred embodiment of the rolling bearing assembly according to the invention.

FIG. 6 is a perspective view of the cage of FIG. 5.

FIG. 7 is an enlarged portion of the cage of FIG. 6.

Figure 1:
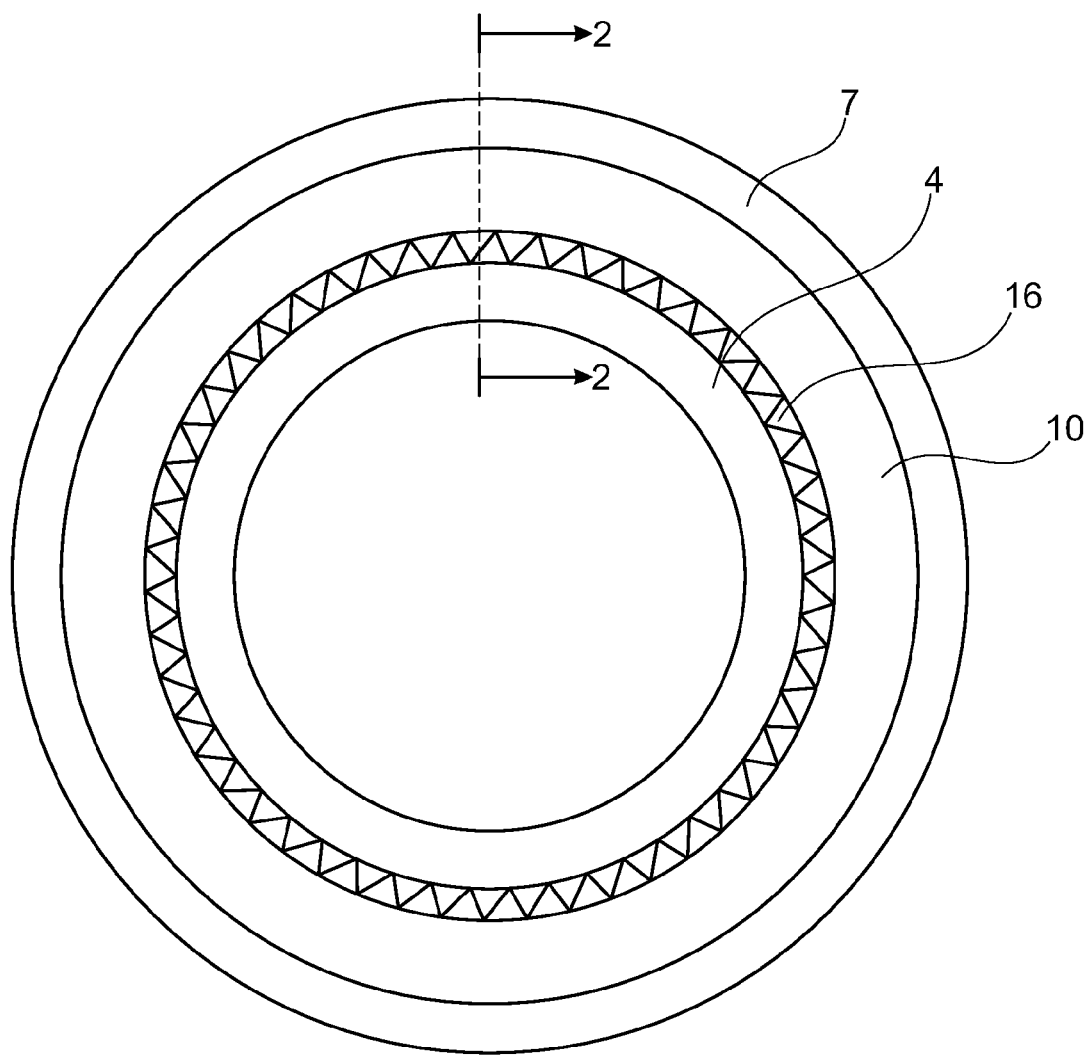
FIG. 1 is an elevational view of a first preferred embodiment of a rolling bearing assembly.

DETAILED DESCRIPTION OF THE
PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 shows a first preferred embodiment of a rolling bearing assembly 1 according to the present invention. The rolling bearing assembly 1 includes a radially inner ring 4, a radially outer ring 7, and a plurality of rolling elements 2 supported to roll on a radially outer race 5 of the radially inner ring 4 and a radially inner race 8 of the radially outer ring 7, shown more clearly in FIG. 2. A roller assembly including the plurality of rolling elements 2 is located between the rings 4, 7. The rolling elements 2 are preferably balls. The roller assembly preferably includes a cage 3 for the rolling elements 2. The cage 3 is preferably brass. However, other conductive materials can be used.

Figure 2:
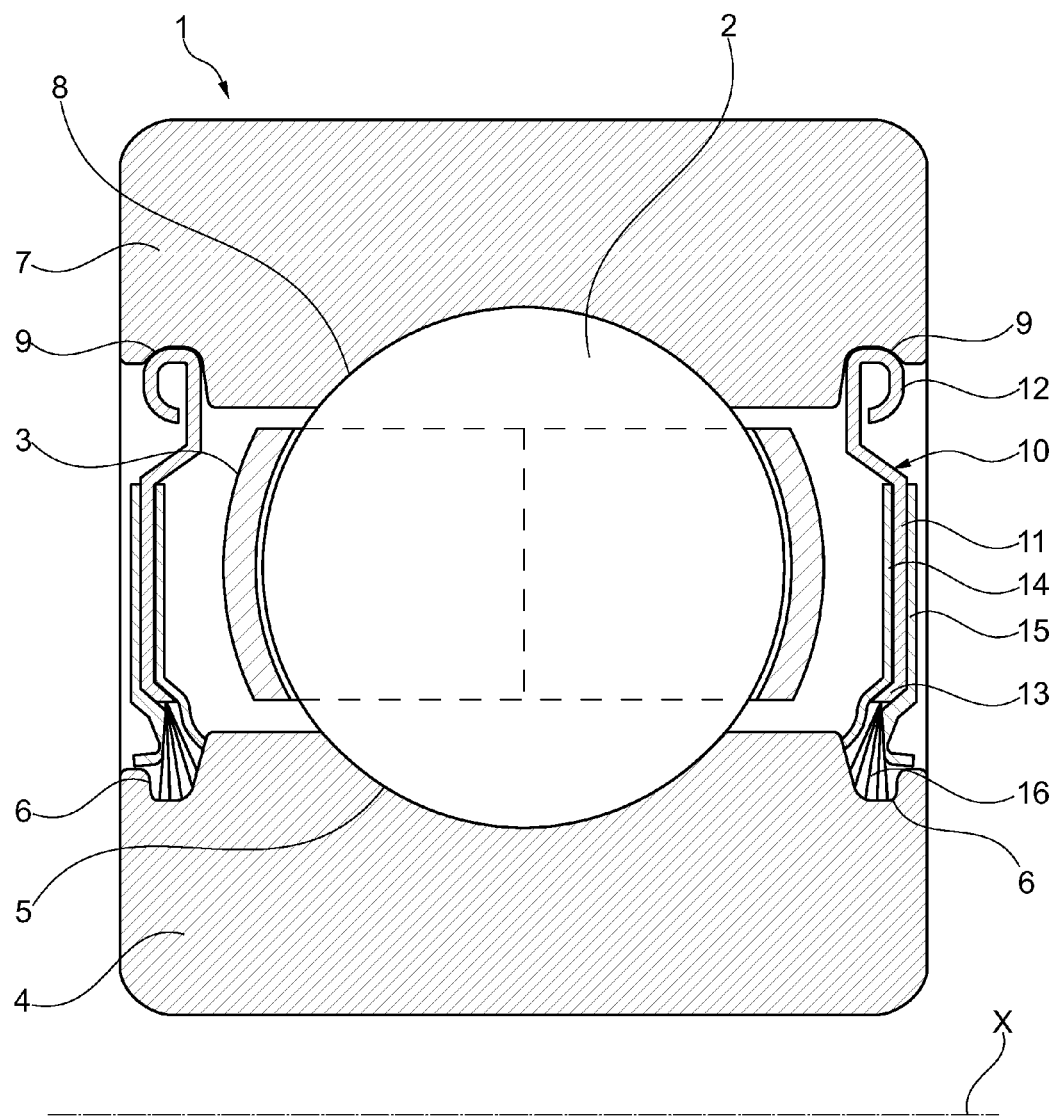
FIG. 2 is a cross-sectional view of the rolling bearing assembly taken along line 2-2 in FIG. 1.

As shown in FIG. 2, the radially inner ring 4 preferably includes a pair of indentations that form annular grooves 6 on a radially outer surface. The radially outer ring 7 preferably also includes a pair of indentations that form annular grooves 9 on a radially inner surface. A shield 10 axially offset from the roller assembly extends radially between the radially inner ring 4 and the radially outer ring 7. The shield 10 includes a body portion 11 with two radial ends 12, 13. The body portion 11 is preferably gold plated steel, copper, or other sufficiently conductive material. One of the radial ends 12, 13 of the body portion 11 is fixed to either the radially inner ring 4 or the radially outer ring 7. One of the radial ends 12, 13 is preferably fixed in one of the grooves 6, 9 of the radially inner or outer rings 4, 7. Preferably, one of the shields 10 is provided on each axial side of the roller assembly.

The shield 10 includes at least one electrically conductive seal 14, 15 on a surface of the body portion 11. The conductive seal 14, 15 preferably comprises a rubber or polymeric material. The conductive seal 14, 15 extends radially from one of the radial ends 12, 13 and contacts the radially inner or outer ring 4, 7. The conductive seals 14, 15 may be on either or both axial surfaces of the shield 10. A conductive element may extend from an opposite radial end 12, 13 of the body portion 11 that contacts the other of the radially inner or outer rings 4, 7. The conductive element may include conductive filaments, or a conductive polymeric material seal with conductive nanofibers.

Preferably, the shield 10 includes a plurality of conductive filaments 16 extending on an opposite radial end 12, 13 of the body portion 11 than the fixed radial end 12, 13. In the illustrated embodiment, the conductive filaments 16 extend from the inner radial end 13; however, they could extend from the outer radial end 12. The plurality of filaments 16 contact the radially inner or outer ring 4, 7 and shunt stray electrical currents to ground. The plurality of filaments 16 are positioned between the conductive inner seal 14 and the conductive outer seal 15. The shield 10 and the plurality of filaments 16 provide an electrical current path between the radially inner ring 4 and the radially outer ring 7 that prevents electrical current from damaging any of the rolling components of the bearing assembly or the races. Specifically, the conductive seals 14, 15 prevent the electrical current from passing through the rolling elements 2.

Figure 3:
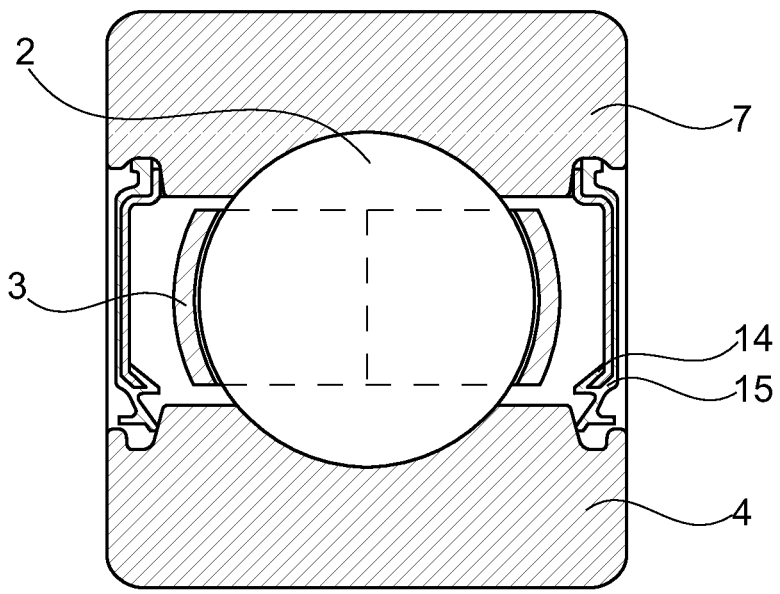
FIG. 3 is a cross-sectional view of a second preferred embodiment of the rolling bearing assembly according to the invention.

In an alternate embodiment of the present rolling bearing assembly 1, as shown in FIG. 3, the conductive seal 14, 15 extends radially between the radially inner ring 4 and the radially outer ring 7. The conductive seal 14, 15 contacts both the radially inner ring 4 and the radially outer ring 7. The conductive seal 14, 15 preferably comprises a rubber or polymeric material that includes conductive nanofibers, such as copper, silver, or gold nanofibers.

Figure 4:
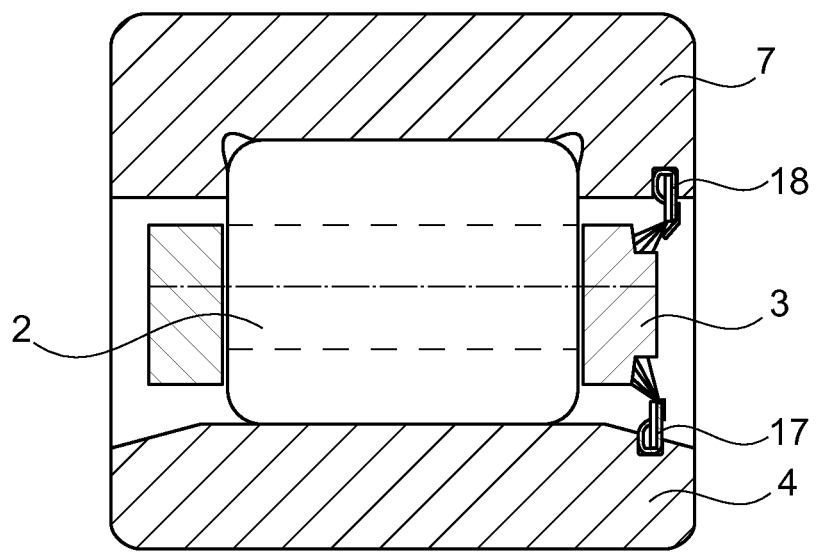
FIG. 4 is a cross-sectional view of a third preferred embodiment of the rolling bearing assembly according to the invention.

In another embodiment of the present rolling bearing assembly 1, as shown in FIG. 4, a radially inner shield 17 and a radially outer shield 18 are provided for shunting stray electrical currents through the cage 3 to ground. One end of the radially inner shield 17 contacts the radially inner ring 4 and the other end of the radially inner shield 17 includes a plurality of filaments that extend radially outwardly and contact the cage 3. One end of the radially outer shield 18 contacts the radially outer ring 7 and the other end of the radially outer shield 18 includes a plurality of filaments that extend radially inwardly and contact the cage 3.

In another embodiment of the present rolling bearing assembly 1, as shown in FIG. 5, the cage 3 includes a plurality of brushes 19 including carbon filament fibers. The brushes 19 may be mechanically fastened to the cage 3. Alternatively, the brushes 19 may be chemically bonded to the cage 3, preferably by a conductive epoxy. As shown more clearly in FIGS. 6 and 7, the brushes 19 may be arranged circumferentially spaced apart from each other around the cage 3. Alternatively, the brushes 19 may extend continuously circumferentially around the cage 3.

In each case, a conductive path through the bearing assembly 1 is provided that is not through the rolling elements 2 in order to prevent EDM damage.

Having thus described various embodiments of the present rolling bearing assembly in detail, it will be appreciated and apparent to those skilled in the art that many changes, only a few of which are exemplified in the detailed description above, could be made in the bearing assembly according to the invention without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

REFERENCE NUMBERS

1 Rolling Bearing Assembly
2 Rolling Element
3 Cage
4 Radially Inner Ring
5 Radially Outer Race
6 Grooves of Inner Ring
7 Radially Outer Ring
8 Radially Inner Race
9 Grooves of Outer Ring
10 Shield
11 Body Portion
12 First Radial End
13 Second Radial End
14 Conductive Inner Seal 15 Conductive Outer Seal
16 Plurality of Filaments
17 Radially inner shield
18 Radially outer shield
19 Brushes
X Axis of Rolling Bearing

What is claimed is:

1. A rolling bearing assembly with electrical discharge damage protection, comprising:
   a radially inner bearing ring, and a radially outer bearing ring, the radially inner bearing ring including a radially outer race and the radially outer bearing ring including a radially inner race;
   a roller assembly including a cage with a plurality of rolling elements, the plurality of rolling elements are supported to roll on the radially inner race of the radially outer bearing ring and the radially outer race of the radially inner bearing ring; and
   a first plurality of brushes and a second plurality of brushes each spaced apart from the radially inner race and the radially outer race,
   the first plurality of brushes and the second plurality of brushes provide electrically conductive contact between the cage, the radially inner bearing ring, and the radially outer bearing ring, and
   the first plurality of brushes extends directly between the radially inner bearing ring and the cage and the second plurality of brushes extends directly between the radially outer bearing ring and the cage.

2. The rolling bearing assembly of claim 1, wherein the first plurality of brushes and the second plurality of brushes are bonded to the cage with a conductive epoxy.

3. The rolling bearing assembly of claim 1, wherein the first plurality of brushes and the second plurality of brushes extend circumferentially around the cage.

4. The rolling bearing assembly of claim 1, wherein the first plurality of brushes and the second plurality of brushes are each affixed to a respective one of the radially inner ring and the radially outer ring, and contact the cage.

* * * * *